Feb. 21, 1967  H. SILVER  3,305,169
HIGH SPEED HOLLOW DRUM
Filed Sept. 11, 1964
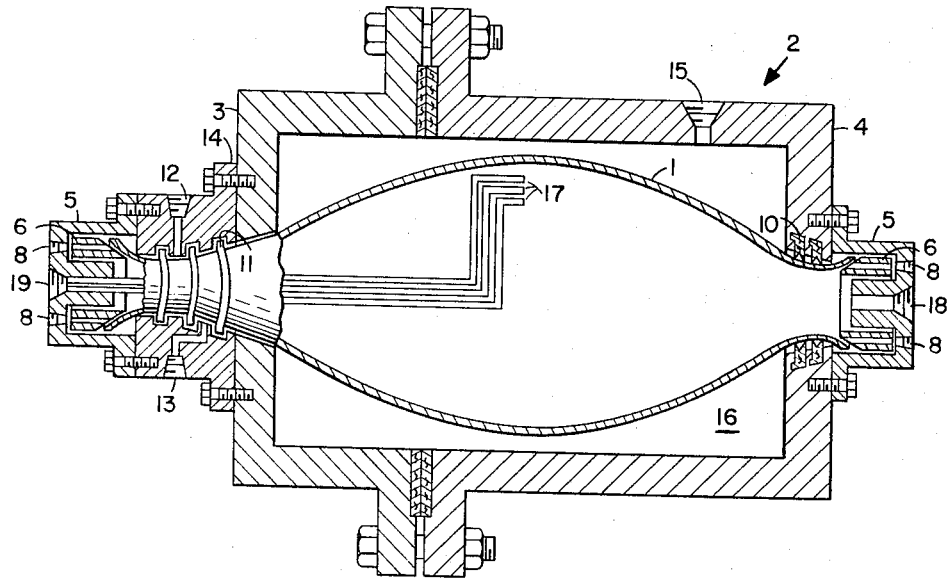
Harold Silver,
INVENTOR.
BY Harry M. Saragovitz
Edward J. Kelly
Herbert Berl
James E. Staudt
ATTORNEYS

United States Patent Office 3,305,169
Patented Feb. 21, 1967

3,305,169
HIGH SPEED HOLLOW DRUM
Harold Silver, Riverton, N.J., assignor to the United States of America as represented by the Secretary of the Army
Filed Sept. 11, 1964, Ser. No. 395,969
8 Claims. (Cl. 233—1)

The present invention relates to a high speed rotating drum and more specifically to a drum which rotates within a closed housing which is pressurized to compensate for centrifugal force exerted on the drum wall by high rotational speeds.

It has long been a problem to provide a hollow drum which may be rotated at high speeds without danger of its disintegrating because of centrifugal force. This problem cannot be solved by merely increasing the amount of material used in rotating drums since inertia effects increase with the increase of material in the walls of the drum and little relief is gained. The problem is not only one of dependability of the device but the drums now in use present severe safety hazards to personnel in the vicinity of such an operating drum. Rotating drums of this type have a great variety of uses, one of the most common being the separation of gases having various densities. High speed rotating drums may also be used as time magnetic recording devices, gas driven gyroscopes, or optical shutters for high speed cameras.

Accordingly, one object of my invention is to provide a rotating drum which is capable of extreme rotational speeds without danger of the drum losing its structural integrity.

Another object of my invention is to provide a device which is capable of rotating a drum at high speeds and which utilizes a minimum of material and is simple in operation and manufacture.

Yet another object of my invention is to provide a high speed rotary drum which is economical to manufacture, and safe in operation.

Still another object of my invention is to provide a high speed rotary drum having a minimum of friction at its bearing points.

Other features of my invention will become apparent in the course of the following description hereof with reference to the accompanying drawings, given merely by way of example, and in which:

The figure is a cross sectional view of the rotational drum and its housing.

Referring now to the figure it will be seen that a thin walled hollow drum 1 is mounted for rotation within a housing 2. Housing 2 is formed of a turbine end portion 3 and a sealing end portion 4. Alternately, both ends may be used as a turbine, thus achieving work from the leakage resulting at both ends. Attached to each end of said housing are bearing supports 5. Within each of these bearing supports is located a hydrostatic conical bearing 6. To provide the bearing with a fluid supply, inlets 8 are formed in each of the supports in alignment with the bearings. To provide effective closure of the housing a labyrinth type seal 10 is located on one end of the housing while a driving turbine 11 at the other end of the housing serves as a propelling means for rotating the drum as well as a sealing device. Inlet passage 12 is provided in a split nozzle housing 14 for supplying additional turbine fluid utilized to operate turbine 11 should leakage past the turbine seal be insufficient. Outlet passage 13 serves to bleed off fluid at relatively high pressure to supply bearing inlets 8 if desired. The bearing supports, nozzle housing and housing end portions are secured to one another by means of bolts, each bolted joint being sealed to prevent leakage from within housing 2. A high pressure inlet 15 is provided in housing 2 to supply chamber 16 with fluid at a pressure sufficient to prevent deformation of the thin walls of the rotating drum. A series of gas taps 17 are sequentially arranged within the drum at varying intervals from the axial center line of the drum so as to remove gases fed into the drum through an inlet 18 which is conveniently located on the axial center line of the drum. Because of the high rotational speeds of the drum, the gases located therein will be separated according to their densities, that is, the higher density gases will be forced toward the radial exterior of the drum while less dense gases will remain closer to the axial center line of the drum. The gas taps may be pointed slightly against the rotation direction of the drum so as to require a minimum of suction for removal of the gas to the taps. These gas taps are connected by conduit means to an outlet 19 formed in the end portion of the bearing support on the turbine end of the housing.

In operation of the device pressurized fluid is fed to the auxiliary turbine inlet 12 thus causing rotation of the drum within stationary housing 2. Pressurized fluid is also fed to the hydrostatic conical bearings through bearing inlets 8 at each end of the device, thus providing low friction bearings between the drum and the housing. As pointed out above housing chamber 16 is substantially sealed at one end by means of a multi-stage turbine and at the other end by labyrinth seal 10. As the speed of drum 1 increases high pressure fluid is gradually fed into chamber 16 thus compensating for the increased inertial forces which tend to expand the drum wall in a radially outward direction. Thus it will be seen that rotational speeds heretofore unattainable are easily accomplished by merely balancing the pressure in chamber 16 to compensate for the inertial forces in the wall of hollow drum 1. Of major importance is the fact that in the event of explosion of the drum from any cause the housing will retain the thin wall fragments. The device thus results in a high speed rotating drum which is extremely safe in operation and which may attain the high rotational speeds necessary for various scientific studies.

While the foregoing is a description of the preferred embodiment, the following claims are intended to include those modifications and variations that are within the spirit and scope of my invention.

I claim:

1. An externally pressurized high speed drum assembly comprising a hollow drum, a sealed housing completely surrounding said drum, hydrostatic bearing means arranged between each end of said drum and said housing and mounting said drum for rotation in said housing, means for rotating said drum, and a high pressure inlet formed in said housing for receiving pressurized fluid in the housing to support said drum externally in opposition to internal forces acting outwardly on said drum.

2. A device as set forth in claim 1 wherein said drum rotating means comprises a multi-stage turbine formed on one end of said drum and said housing, and wherein passage means are formed in the turbine end portion of said housing for supplying fluid to said turbine and exhausting said fluid therefrom.

3. A device as set forth in claim 1 wherein said hydrostatic bearing means are conically shaped hydrostatic bearings, and wherein fluid passage means are formed in each end of said housing for supplying fluid to each of said hydrostatic bearings.

4. A device as set forth in claim 3 wherein said drum assembly further comprises a fluid inlet means formed in one end of said drum and housing, fluid outlet means at the other end of said drum and housing, and a series of gas taps sequentially arranged within said drum with said gas taps having inlet ends arranged at varying distances from axial center of rotation of said drum and outlet ends connected to said fluid outlet means.

5. A high speed drum assembly comprising a hollow stationary housing having inlet and outlet passages at opposite ends thereof, an open-ended hollow drum mounted within said housing for rotational movement therein, means for rotating said drum, sealing means between the ends of said drum and said housing means thereby forming a sealed area between the exterior of said drum and the interior of said housing, and means in said housing for supplying high pressure fluid to said sealed area for supporting said drum externally against forces tending to expand said drum.

6. A device as set forth in claim 5 wherein a series of gas taps are sequentially arranged within said drum at various intervals between the rotating axis of said drum and the interior wall thereof, said gas taps being in fluid communication with the inlet and outlet passages of said housing.

7. A device as set forth in claim 6 wherein said rotating means comprises a multi-stage turbine mounted on one end of said hollow drum, said turbine being formed integrally with said drum and said housing, and wherein turbine inlet and outlet means are formed in said housing.

8. An externally pressurized high speed drum assembly comprising: a hollow drum; a sealed housing completely surrounding said hollow drum; hydrostatic bearing means arranged within a portion of each end of said hollow drum and mounting said hollow drum for high speed rotation relative to said housing and fluid passages in each end of said housing for supplying fluid to said hydrostatic bearings; a multi-stage turbine integrally formed on said hollow drum and said housing near one end of said hollow drum and housing; passage means in said housing for supplying driving fluid to said turbine and for exhausting fluid from said turbine; a fluid inlet in one end of said housing and in direct communication with the hollow of said drum; an outlet at the other end of said housing and a series of gas taps mounted relative to said outlet and extending into the hollow of the drum to varying axial distances from the center line of the drum; a chamber in said housing formed by a central portion of said housing and central portion of said hollow drum; and a fluid passage in said housing for communicating fluid into said chamber for supporting said drum against forces acting outwardly on said drum tending to expand said drum.

References Cited by the Examiner

UNITED STATES PATENTS

| | | | |
|---|---|---|---|
| 529,662 | 11/1894 | Naylor | 233—21 |
| 1,061,656 | 5/1913 | Black | 233—19 |
| 1,415,881 | 5/1922 | Leitch | 233—21 |
| 2,113,160 | 4/1938 | Murphree et al. | 233—22 |
| 2,661,150 | 12/1953 | Abbott. | |
| 3,108,955 | 10/1963 | Boyland | 233—27 |
| 3,194,492 | 7/1965 | Koffinke et al. | 233—7 |

M. CARY NELSON, *Primary Examiner.*

HENRY T. KLINKSIEK, *Examiner.*